(12) United States Patent  (10) Patent No.: US 8,428,998 B2
Datta-Read et al.  (45) Date of Patent: Apr. 23, 2013

(54) ESTIMATING BUSINESS TARGETS

(75) Inventors: Piew Datta-Read, Carlsbad, CA (US); James Howard Drew, Boxborough, MA (US)

(73) Assignee: Verizon Laboratories Inc., Waltham, MA (US)

( * ) Notice: Subject to any disclaimer, the term of this patent is extended or adjusted under 35 U.S.C. 154(b) by 574 days.

(21) Appl. No.: 12/494,237

(22) Filed: Jun. 29, 2009

(65) Prior Publication Data

US 2010/0332289 A1 Dec. 30, 2010

Related U.S. Application Data

(63) Continuation of application No. 10/163,983, filed on Jun. 6, 2002, now Pat. No. 7,555,442.

(51) Int. Cl.
*G06F 9/46* (2006.01)

(52) U.S. Cl.
USPC .......................................... 705/7.29

(58) Field of Classification Search .................. 705/7.29
See application file for complete search history.

(56) References Cited

U.S. PATENT DOCUMENTS

| | | | | |
|---|---|---|---|---|
| 6,836,773 | B2 * | 12/2004 | Tamayo et al. | 1/1 |
| 6,988,092 | B1 * | 1/2006 | Tang et al. | 707/1 |
| 2002/0169654 | A1 * | 11/2002 | Santos et al. | 705/10 |

OTHER PUBLICATIONS

Seiford et al.; Recent Developments in DEA: The Mathematical Programming Approach to Frontier Analysis; Journal of Econometrics 46; 1990; pp. 7-38.*

Aha, et al., "Instance-Based Learning Algorithms," Machine Learning, vol. 6, No. 1, 1991, DOI: 10.1007/BF00153759, pp. 37-66.

Appa, et al., "On setting scale efficient targets in DEA," The Journal of the Operational Research Society, London School of Economics, Copyright 1999, Retrieved Feb. 11, 2009, from ABI/INFORM Global database, pp. 60-69.

Bauer, "Recent Developments in the Econometric Estimation of Frontiers," Federal Reserve Bank, Journal of Econometrics (46), Copyright 1990, pp. 39-56.

Bennett, et al. "Density-Based Indexing for Approximate Nearest-Neighbor Queries," Proceedings of the Fifth ACM SIGKDD International Conference of Knowledge Discovery and Data Mining, Copyright 1999, pp. 233-243.

Chou, et al., "Identifying Prospective Customers," In Proceedings of the Sixth ACM SIGKDD International Conference on Knowledge Discovery and Data Mining (Boston, MA), Aug. 20-23, 2000, pp. 447-456.

Drew, et al., "Targeting Customers with Statistical and Data-Mining Techniques," Verizon Laboratories Incorporated, Journal of Service Research, vol. 3, No. 3, Feb. 2001, pp. 205-219.

Everitt, et al., "Applied Multivariate Data Analysis," Second Edition, Oxford University Press, Inc., Copyright 2001, 350 pages.

(Continued)

*Primary Examiner* — Romain Jeanty

(57) ABSTRACT

A method for generating business targets includes accessing data (300) corresponding to a number of customers. The data includes variables (310-330) associated with each of the customers and an observed value for each of the customers. The observed value for a customer may represent revenue associated with that particular customer. The method also includes identifying a neighborhood that includes a first customer and a number of the other customers. The method further includes calculating a target for each of the customers in the neighborhood, where the target may represent the potential revenue from each of the customers.

4 Claims, 6 Drawing Sheets

OTHER PUBLICATIONS

Horsky, et al., "Evaluation of Salesforce Size and Productivity Through Efficient Frontier Benchmarking," Institute for Operations Research and the Management Sciences, University of Rochester, Marketing Science, vol. 15, No. 4, 1996, 24 pages.

Johnson, et al., Continuous Univariate Distributions, vol. 1, Second Edition, Wiley Series in Probability and Mathematic Statistics, John Wiley & Sons, Copyright 1994, 772 pages.

MacQueen, "Some Methods for Classification and Analysis of Multivariate Observations," University of California at Los Angeles, Proceedings of the Fifth Berkeley Symposium on Mathematical Statistics and Probability, Copyright 1967, pp. 281-297.

Mahalanobis, "On the Generalized Distance in Statistics," National Institute of Science of India, vol. II, No. I, Apr. 15, 1936, pp. 49-55.

Maneewongvatana, et al., Analysis of Approximate Nearest Neighbor Searching with Clustered Point Sets, DIMACS Series in Discrete Mathematics and Theoretical Computer Science, University of Maryland, Copyright 2002, pp. 1-20.

Mani, et al, "Statistics and Data Mining Techniques for Lifetime Value Modeling," GTE Laboratories Incorporated, Proceedings of the Fifth International Conference on Knowledge Discovery and Data Mining, Copyright 1999, pp. 94-103.

Post et al., "Theory and Methodology, Performance benchmarking using interactive data evelopment analysis," European Journal of Operations Research (115), Dec. 18, 1996, pp. 472-487.

Sinha et al., "Sales-Force Decision Models: Insights from 25 Years of Implementation," Interfaces (31:3), Part 2 of 2, May-Jun. 2001, pp. 58-544.

Stanfill et al., "Toward Memory-Based Reasoning," Communications of the ACM, vol. 29, No. 12, Dec. 1986, pp. 1213-1228.

Wilson, et al., "Improved Heterogeneous Distance Functions," Journal of Artificial intelligence Research (6), Jan. 1997, pp. 1-34.

\* cited by examiner

FIG. 3

ESTIMATING BUSINESS TARGETS

RELATED APPLICATION

This application claims priority under 35 U.S.C. §120 based on U.S. patent application Ser. No. 10/163,983 filed on Jun. 6, 2002 which is incorporated herein by reference, which is issuing on Jun. 30, 2009 as U.S. Pat. No. 7,555,442 and which, in turn, claims priority under 35 U.S.C. §119 based on U.S. Provisional Application No. 60/298,271 filed Jun. 14, 2001, the disclosure of which is also Incorporated herein by reference.

BACKGROUND OF THE INVENTION

1. Field of the Invention

The present invention relates generally to business performance targets and, more particularly, to generating revenue targets or other business performance targets.

2. Description of Related Art

Companies typically estimate expected revenues or generate revenue targets based on a number of factors. For example, one factor associated with estimating expected revenues is determining how much a customer is willing to spend for a particular product or service. The accuracy of these revenue expectations can have significant implications. For example, a company may alter its operating procedures and/or staffing level based on whether it meets its revenue expectation.

In practice, these revenue expectations are often derived in an ad hoc manner. For example, sales targets for a regional business division or sales targets to individual customers are typically set according to past performance or financial goals. Such sales targets, therefore, may reflect poor business or selling practices or may neglect intrinsic capabilities.

One conventional method used to estimate customer sales potential is regression analysis. Regression analysis generally estimates an average (or in some manifestations, an upper percentile) target. A problem with this approach is that the target, by definition, is not a maximal potential. Regression analysis also uses some pre-specified functional form and error structure to be applied to all customers at once. Such an approach is typically too restrictive for all different types of customers.

Other conventional methods used to estimate maximal or minimal targets are data envelopment analysis (DEA) and frontier analysis. In DEA analysis, the maximal target is described by $\phi_i = g(x_i)$ where $\phi_i$ is the target for $x_i$, a vector for the ith observation. In DEA, the task is to find a surface that exceeds or "envelopes" each observation. The estimated target is set to the maximum (or minimum) from the observed targets. One drawback with this approach is that it is sensitive to errors since it assumes that all observed targets define the possible space. As such, DEA is sensitive to outliers (i.e., observations that are far outside the other observations) and often results in unrealistic target values.

In frontier analysis, the target is described by $\phi_i = g(x_i) + \epsilon_i$, where $\epsilon_i$ is a non-negative error term. This sets the target above its observed performance. One drawback with this approach is the requirement of a model for "g" and for the error term. Pre-specifying the functional form and the error term using some artificial mathematical model, e.g., linear, quadratic, Cobb-Douglass function, translog, etc. typically results in inadequate target values. In other words, relationships in the real world are not typically linear, quadratic, etc. Therefore, frontier analysis usually generates target values that not usable in real world scenarios.

Therefore, a need exists for systems and methods that enable a company to generate usable business performance targets.

SUMMARY OF THE INVENTION

Systems and methods consistent with the present invention address these and other needs by first identifying similar entities using nearest neighbor methodology. These similar entities constitute a neighborhood for each specified entity. Frontiers or targets for each entity may then be established based on its particular neighborhood.

In accordance with the principles of the invention as embodied and broadly described herein, a method is provided that includes accessing data corresponding to a number of entities. The data includes variables associated with each of the entities and each of the entities has a corresponding observed value representing a performance level. The method also includes identifying a neighborhood including a first one of the entities and other ones of the entities. The method further includes calculating at least one of a maximal and minimal target for the neighborhood, where the target is associated with the performance level.

In another implementation consistent with the present invention, a computer-readable medium having stored sequences of instructions is provided. The instructions cause a processor to access data corresponding to a number of entities, where the data includes an observed value for each of the entities. The instructions also cause the processor to identify a neighborhood including a first entity and at least one other entity and calculate at least one of a maximal and minimal target for the neighborhood, where the target is associated with business revenue.

In still another implementation consistent with the present invention, a method for generating a business target includes accessing a database that includes information on a number of customers, where the information includes data associated with each customer's business and data representing a past performance value associated with each customer. The method also includes identifying a neighborhood including the first customer and at least one other customer. The method further includes calculating a target for the neighborhood, where the target is associated with a business performance level.

BRIEF DESCRIPTION OF THE DRAWINGS

The accompanying drawings, which are incorporated in and constitute a part of this specification, illustrate the invention and, together with the description, explain the invention. In the drawings.

FIG. 3 illustrates a portion of an exemplary database consistent with the present invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention use a distance function to identify neighborhoods populated with closely related entities. After identifying the neighborhood, a target for each entity in the neighborhood may be determined. The target may be then be used to identify under marketed customers for targeted upselling and increased sales attention. The target may also be used as an incentive for a sales person to attempt to increase customers' spending.

Exemplary System

Figure 1:
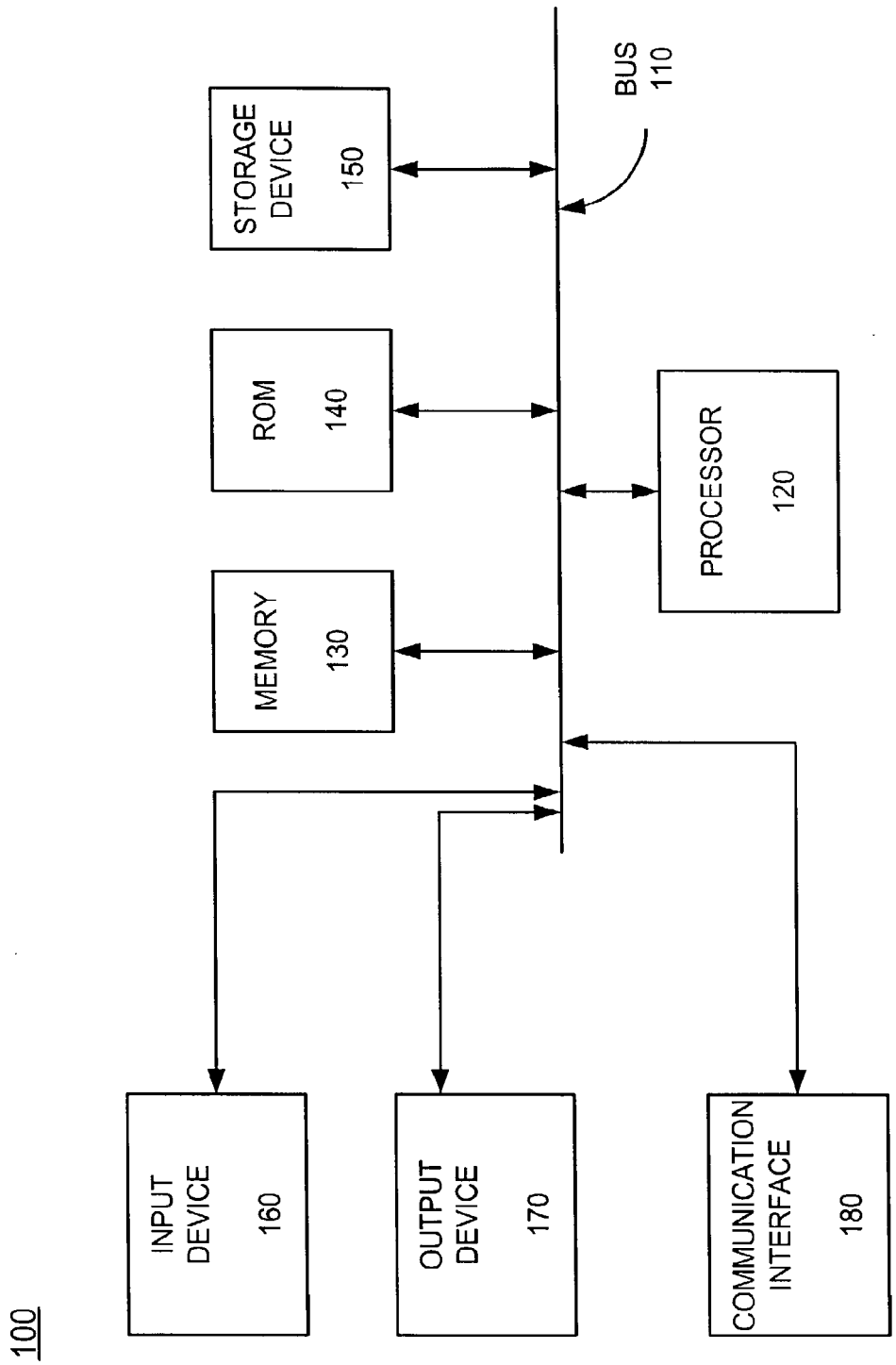
FIG. 1 is a diagram of an exemplary system in which methods and systems consistent with the present invention may be implemented.

FIG. 1 illustrates an exemplary system in which methods and systems consistent with the present invention may be implemented. System 100 includes a bus 110, a processor 120, a memory 130, a read only memory (ROM) 140, a storage device 150, an input device 160, an output device 170, and a communication interface 180. The bus 110 permits communication among the components of system 100.

The processor 120 may include any type of conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. The ROM 140 may include a conventional ROM device or another type of static storage device that stores static information and instructions for processor 120. The storage device 150 may include any type of magnetic or optical recording medium and its corresponding drive, such as a magnetic disk or optical disk and its corresponding disk drive.

The input device 160 may include one or more conventional mechanisms that permit a user to input information to the system 100, such a keyboard, a mouse, a pen, a biometric mechanism, such as a voice recognition device, etc. The output device 170 may include one or more conventional mechanisms that output information to the user, including a display, a printer, one or more speakers, etc. The communication interface 180 may include any transceiver-like mechanism that enables system 100 to communicate via a network. For example, the communication interface 180 may include a modem or an Ethernet interface for communicating via a local area network (LAN). Alternatively, the communication interface 180 may include other mechanisms for communicating with other devices and/or systems.

System 100, consistent with the present invention, defines neighborhoods of similar entities using nearest neighbor methodology and estimates frontiers (i.e., targets) for each entity from its neighborhood. System 100 performs such functions in response to processor 120 executing sequences of instructions contained in a computer-readable medium, such as memory 130. A computer-readable medium may include one or more memory devices and/or carrier waves. Such instructions may be read into memory 130 from another computer-readable medium, such as a data storage device 150, or from a separate device via communication interface 180.

Execution of the sequences of instructions contained in memory 130 causes processor 120 to perform certain acts that will be described hereafter. In alternative embodiments, hardwired circuitry may be used in place of or in combination with software instructions to implement the present invention. In still other alternatives, various acts may be performed manually, without the use of system 100. Thus, the present invention is not limited to any specific combination of hardware circuitry and software.

Exemplary Processing

Figure 2:
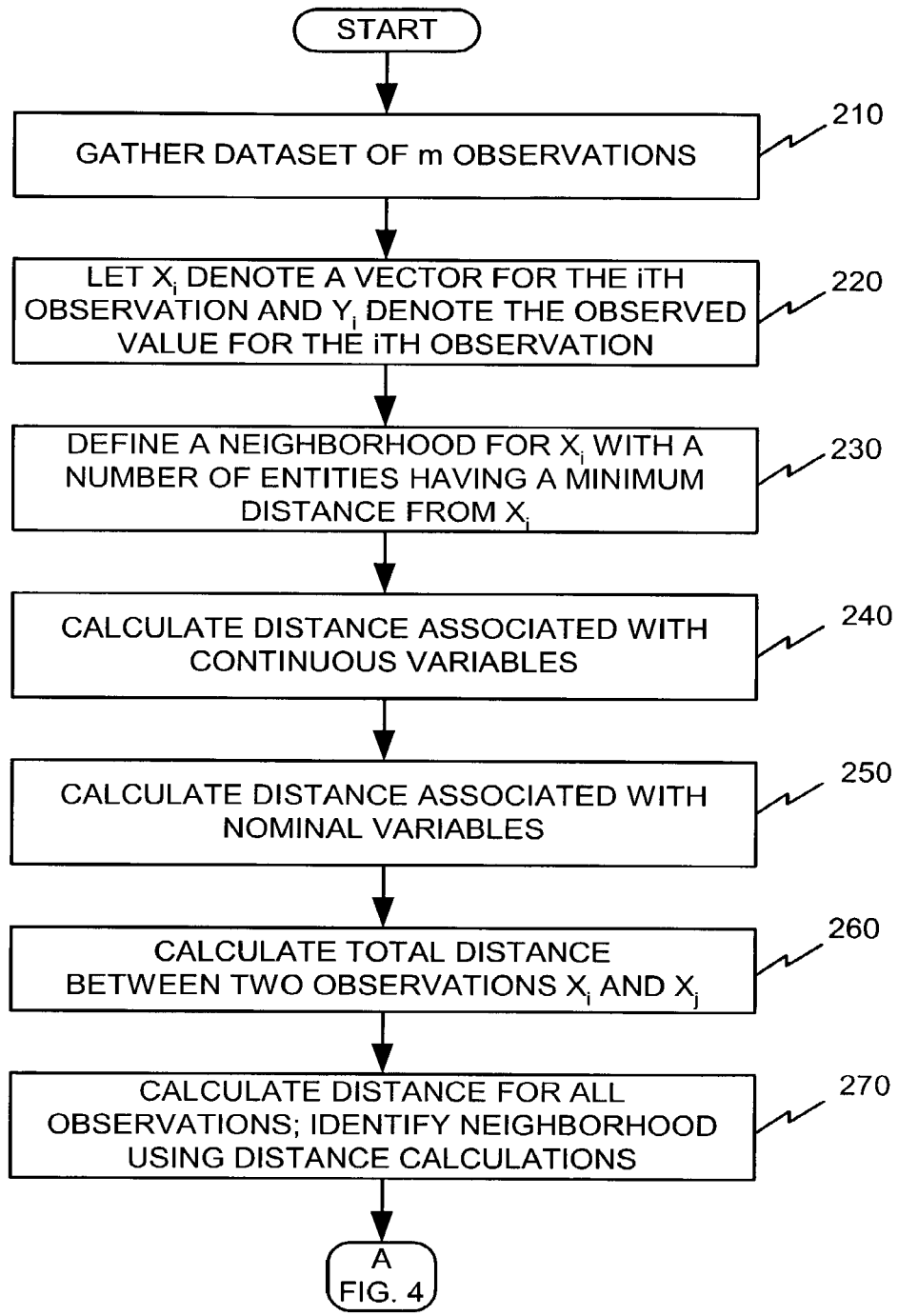
FIG. 2 is a flow diagram illustrating exemplary processing associated with defining neighborhoods.

FIG. 2 is a flow diagram illustrating processing associated with defining neighborhoods in an exemplary implementation consistent with the present invention. Processing may begin by gathering a dataset of m observations (act 210). The m observations may represent any particular set of observations for which a user wishes to establish a maximal or minimal target. For example, the m observations may represent various businesses/entities that advertise in a local telephone company's yellow pages directory. The description below uses the example of dentists that advertise in the yellow pages directory, where m represents the number of dentists. In this example, the local telephone company publishing the yellow pages directory may wish to establish targets for how much each dentist should spend on advertising in the yellow pages, as described in more detail below.

In an exemplary implementation of the present invention, system 100 (FIG. 1) may store information about the dentists that advertise in the yellow pages. For example, storage device 150 may include a database that stores information regarding dentists and other entities that advertise in the yellow pages.

Figure 3:
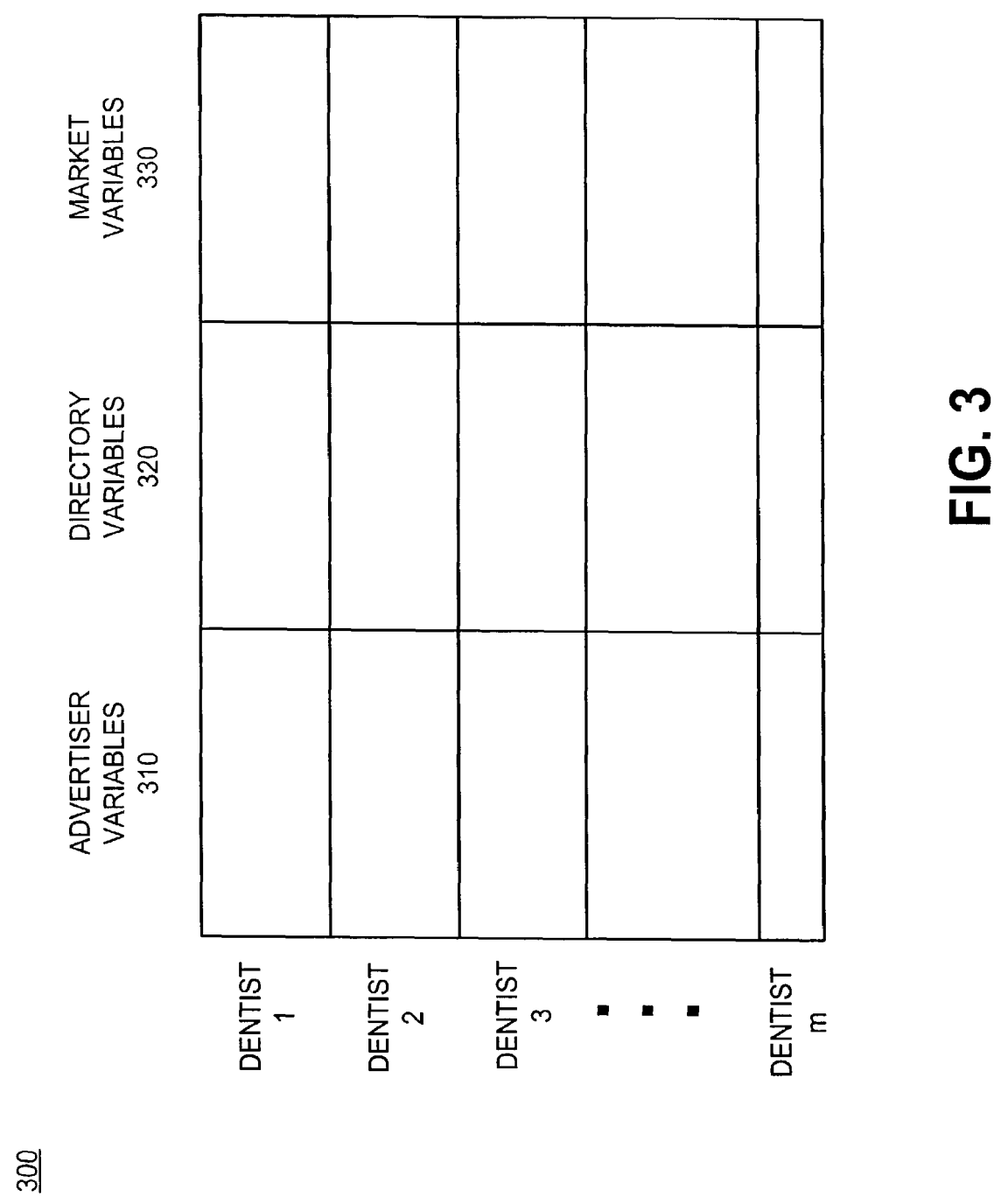

FIG. 3 illustrates a portion of an exemplary database 300 that may be stored, for example, in storage device 150. Database 300 may include data associated with the various listings in the yellow pages directory. Each data listing may include information particular to the type of listing. For example, the data associated with dentists may include three or more categories of data, including: advertiser variables 310, directory variables 320 and market variables 330.

The advertiser variables 310 may include information such as the number of employees that the dentist has, the amount of business income the dentist takes in, whether the dentist's practice is local or national, the amount that the dentist spends on yellow pages advertising and the manner in which the advertiser was marketed to by the yellow pages publisher (e.g., telephone, Internet, in-person, etc). The directory variables 320 may include information such as the distribution size of the yellow pages directory, a competitive index relating to the competition from other directories, directory penetration in terms of the number of households that receive the directory and unit pricing for advertisements in the directory. The market variables 330 may include median household income in the area where the directory is distributed, total number of businesses in the directory, number of dentists in the directory, distribution area of the directory, penetration of the directory heading and an estimated market growth rate for the area and/or for the particular directory heading. It should be understood that the variables described in database 300 are exemplary and additional/different variables may be used in other implementations of the present invention based on the particular entities involved. It should also be understood that some of these variables may be estimated if the actual values are not known or are not readily available.

Processor 120 may retrieve the dataset of m observations from database 300. As described above, database 300 may be stored in storage device 150. Alternatively, database 300 may be stored external to system 100 and may be accessed via communication interface 180. In still other alternatives, the dataset of m observations may be input manually to system 100 via input device 160.

In any event, after the dataset of m observations is obtained, let $x_i$ denote a vector of values associated with ith observation and $y_i$ denote the variable containing its observed value (act 220). For example, if $x_i$ represents a particular dentist, then $y_i$ may represent the advertising revenue that the local telephone company received from that dentist for his/her yellow pages ad. Next, the process defines a neighborhood $n_i$ to be the neighborhood for $x_i$ where $n_i$ is a set of observations $\{x_i, x_j, \ldots\}$ such that $n_i$ contains those entities that have a minimum distance from $x_i$ (act 230). Each observation, therefore, will be associated with a specific neighborhood containing its most similar observations. In an exemplary implementation of the present invention, the neighborhood $n_i$ may be set to include a relatively small number of observations, such as five or less (e.g., four observations). In other implementations, the neighborhood may include a larger number of observations (e.g., 100 or more), based on the particular entities involved and the user's requirements. It has been found, however, that defining a smaller neighborhood, such as a neighborhood with four observations/entities, may result in more precise data for estimating purposes.

In each case, a similarity or distance function between observations may be used to establish the neighborhoods. The domain associated with the observations may be defined by both continuous and nominal variables. For example, a continuous variable may be the amount of income that the dentist's practice received during a particular year. A nominal variable may include the location of the dentist or the relation of the dentist to the yellow pages organization. For example, the dentist may have his/her office in an area considered to be "local" to the telephone company publishing the yellow pages directory. Alternatively, the dentist may be in an area considered to be "foreign" to the local telephone company (i.e., outside the vicinity of the company publishing the directory).

As described above, the domain for dentists may be defined by both continuous and nominal variables. In this case, processes consistent with the present invention define the distance between observations using a separate function for each type of variable and then combine the results. For example, the distance between two continuous variables $x_i$ and $x_j$ may be calculated using a weighted Minkowski equation, such as that given by equation (1) below (act 240).

$$C(x_i, x_j) = \left[\sum_{q \in continuous} [|x_{iq} - x_{jq}| w_q]^r \right]^{1/r} \quad \text{Eq. (1)}$$

where $x_{iq}$ denotes the value of the qth variable for $x_i$, $x_{jq}$ denotes the value of the qth variable for $x_j$, $w_q$ denotes the weight for the qth variable, and r is set to some value depending on the variable transformations applied. For example, r may be set to either 1 or 2.

The weighting for each variable may require knowledge of the particular domain. For example, the amount of income that the dentist's practice receives annually may be weighted more heavily than other factors, such as market growth, since it would be expected that the dentist's income would strongly influence how much a dentist would be willing to spend on advertising. Therefore, in some implementations of the present invention, the weights for many of the directory variables 320 and market variables 330 may be lower than the weights for many of the advertiser variables 310. Various techniques, such as regression analysis, may also be used to estimate each variable's relative contribution to the amount a particular dentist spends on yellow pages advertising. In still other implementations, the weighting may be the same for each variable.

In addition, since each of the continuous variables may have different magnitudes and distributions, implementations consistent with the present invention may standardize or normalize the continuous variables to allow better control of the contribution of each variable to the distance calculation. A particular continuous variable may be transformed by subtracting its mean over all observations and then dividing by some measure of its variability. Other transformation may also be used. For example, the continuous variables may be transformed by a natural log function prior to calculating the distance in equation (1) above.

In any event, after determining the distance associated with each of the continuous variables, the process calculates the distance for the nominal variables (act 250). In an exemplary implementation, the process uses a weighted distance equation, such as that given by equation (2) below.

$$N(x_i, x_j) = \left[\sum_{q \in nominal} \left\{\begin{array}{ll} 0, & x_{iq} = x_{jq} \\ w_q^r, & x_{iq} \neq x_{jq} \end{array}\right\}\right]^{1/r} \quad \text{Eq. (2)}$$

where $x_{iq}$ denotes the value of the qth variable for $x_i$, $x_{jq}$ denotes the value of the qth variable for $x_j$, $w_q$ denotes the weight for the qth variable, and r is set to some value depending on the variable transformations applied. For example, similar to the description regarding the continuous variables, r may be set to either 1 or 2.

In addition, similar to the discussion of weighting with respect to equation (1), various techniques, such as regression analysis, may be used to estimate each nominal variable's relative contribution to the amount a particular dentist spends on yellow pages advertising. In each case, the weighting for each variable may require knowledge of the particular domain.

The distance D between the two observations $x_i$ and $x_j$ may then be calculated by adding the contributions from the continuous and nominal variables using equation (3) below (act 260).

$$D(x_i, x_j) = N(x_i, x_j) + C(x_i, x_j) \quad \text{Eq. (3)}$$

It should also be understood that other equations associated with calculating a distance between continuous variables and nominal variables may be used in alternative implementations consistent with the present invention. For example, implementations consistent with the present invention may use more complex distance metrics, such as a Mahalanobis metric, to calculate the distance between observations. In each case, the selected distance metric is designed to provide a relatively small neighborhood of entities that are essentially identical, other than the amount they spend on yellow pages advertising.

After calculating the distance D between observations $x_i$ and $x_j$, the process calculates the distance between $x_i$ and each of the other observations in the dataset in a similar manner (act 270). The process then identifies a neighborhood that includes k observations that have the minimum distance D from $x_i$ (act 270). For example, the neighborhood $n_i$ may be defined at act 230 such that associated with each observation $x_i$, there are k−1 other observations that are similar (assuming k=|$n_i$|), where k is equal to four. In this case, using the example of dentists, for each dentist, there may be three (i.e., 4−1) other dentists that are in the same neighborhood.

The computational complexity described above for identifying the nearest neighbors is $O(n^2)$. In an implementation consistent with the present invention, a method for increasing the efficiency of the computation can employ a "short circuit" (i.e., decision logic), such that the computation for the $D(x_i, x_j)$ is stopped if the current distance is greater than that of the smallest distances already found. Other methods of reducing computational complexity via approximate nearest neighbor searches and using more complex data structures, such as kd-trees, or creating specialized database indexes can also be applied in implementations consistent with the present invention. In each case, after identifying a neighborhood $n_i$ of similar observations, the process generates target values for the neighborhood, as described in more detail below.

Figure 4:
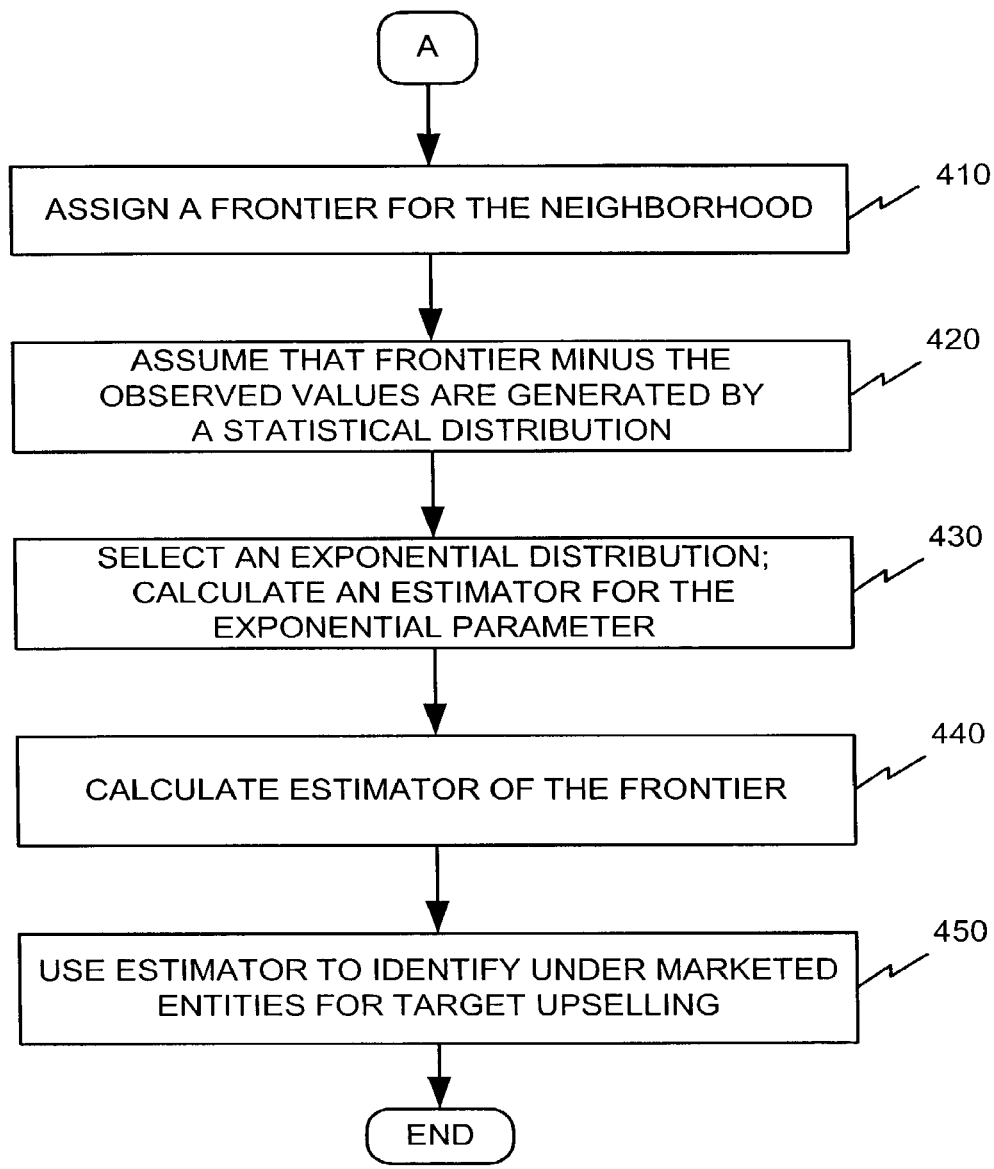
FIG. 4 is a flow diagram illustrating exemplary processing associated with estimating targets.

FIG. 4 illustrates an exemplary process for estimating targets for each observation in a neighborhood. For the neighborhood identified at act 270, assign $\phi_i$ as the frontier (i.e., target) for $n_i$ (act 410). As described previously, $y_1, y_2, \ldots, y_k$ represent the observed measures associated with the entities in the neighborhood. For example, $y_1$, $y_2$, $y_3$ and $y_4$ may represent the actual amount spent on yellow pages advertising by four dentists in the same neighborhood $n_i$. Next, assume that $\phi_i - y_{ik} \sim f(\lambda_i)$, where $f(\lambda_i)$ is a statistical distribution taking on only non-negative values (act 420). In other words, assume that the frontier $\phi_i$ minus the observed values for each entity in the neighborhood are generated by a statistical distribution. The distribution, consistent with the present invention, may be considered to be exponential, Gamma, half-Normal or another type of positive distribution used by econometricians.

In an exemplary implementation of the present invention, the process assumes that the distribution is exponential (act 430). In this case, let $y_{i(1)}, y_{i(2)}, \ldots, y_{i(k)}$ define the order statistics for the observed performance, such that $y_{i(1)}$ is the largest observed measure in $n_i$. For example, suppose $y_{i(1)}$ represents the highest amount spent by one of the dentists on advertising in the yellow pages. For the exponential distribution defined by $\phi_i - y_{ik}$, two natural estimators that may be used to estimate the frontier are the maximum likelihood estimator and a linear unbiased estimator. The maximum likelihood estimator of the frontier $\phi_i$ is $y_{i(1)}$. In this case, the target frontier would be set at the largest observed value in that neighborhood. From a business viewpoint, this may be undesirable since the business performance goal would require no increase over the largest observed value (i.e., the business performance is set to be at the frontier). Therefore, an exemplary implementation of the present invention calculates an unbiased estimator of the exponential parameter $\lambda_i$ (act 430). For example, the estimator of exponential parameter, i.e., $\hat{\lambda}_i$, may be calculated using equation (4) below.

$$\hat{\lambda}_i = \frac{1}{k-1} \sum_{j=1}^{k-1} (k-j)(y_{i(j+1)} - y_{i(j)}) \quad \text{Eq. (4)}$$

The estimator of the frontier, $\hat{\phi}_i$, may then be calculated using equations (5) and (6) below (act 440).

$$\hat{\phi}_i = y_{i(1)} + \frac{\hat{\lambda}_i}{k} \quad \text{Eq. (5)}$$

$$\hat{\phi}_i = y_{i(k)} - \frac{\hat{\lambda}_i}{k} \quad \text{Eq. (6)}$$

Equation (5) above represents the maximum target and equation (6) represents the minimum target for each observation $x_i$, where k is equal to the number of observations in the neighborhood. For some measures of performance, the maximum target would be used and for others, the minimum target would be more appropriate. For example, the maximum target might by selected for the advertising amount spent by a dentist advertising in the yellow pages. The minimum target might be selected for the company's cost of soliciting an advertiser.

After generating the estimator for the frontier, the estimator may be used to set performance goals for the process under scrutiny. In a marketing context, the frontier estimators might be used to set sales goals to identify under marketed customers for targeted upselling (act 450). For example, a sales person may use the estimator of the frontier to attempt to persuade a customer, such as a dentist, to increase the amount of yellow pages advertising he/she buys.

Calculating the estimated frontier, as described above, is an unsupervised task, i.e., the actual frontier or maximum performance level is unknown. The observed performance level, however, may represent an indirect measure of this unknown maximum. As described in the example above, the observed revenue variable is not used in any form for finding neighborhoods, but may be used to compare neighborhoods for verification purposes, as described in more detail below.

Gaining Insight into Advertiser Revenue

After determining the maximal frontier for a number of neighborhoods, implementations consistent with the present invention may use a heuristic approach for comparing various neighborhoods to determine whether the methodology used to generate the neighborhoods and their respective frontiers is reasonable. One way of assessing the reasonableness of the estimated frontiers is by summarizing its estimations as a simple statistical model or a small set of decision rules. An exemplary process for comparing neighborhoods consistent with the present invention generates a value $E(x_i)$, the ratio of $y_i$ to the estimated target $\hat{\phi}_i$, using equation (7) below.

$$E(x_i) = \begin{cases} |n_i| > 1, & (y_i / \hat{\phi}_i) \\ |n_i| = 1, & \text{undefined} \\ \hat{\phi}_i = 0, & \text{undefined} \end{cases} \quad \text{Eq. (7)}$$

In this case, if the maximal frontier is considered (equation 5), $E(x_i)$ will range from 0 to 1 and will illustrate the proportion of the target attained. For example, if $E(x_i)$ is equal to 0.5, this means that a particular entity (e.g., a dentist) is spending 50% of the target amount for entities in that dentist's neighborhood. If the minimal frontier is considered, then $E(x_i) \geq 1$ and $E(x_i)$ will show the number of times the observed value is larger than the minimum. The distribution of $E(x_i)$ will vary depending on the estimation method and the distribution of the target.

Figure 5:
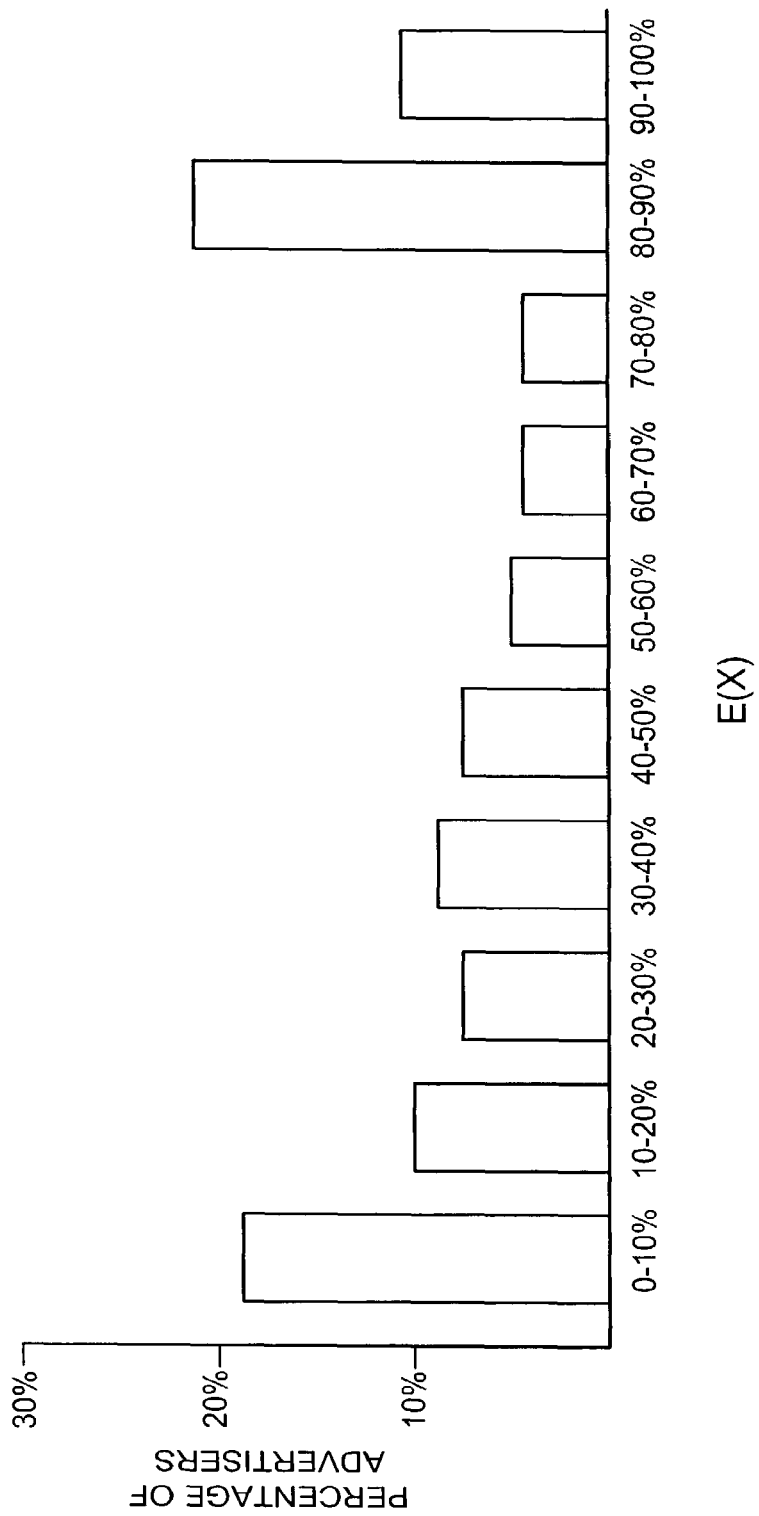
FIG. 5 illustrates an exemplary distribution associated with a number of entities depicting the ratio of an observed value to a target value.

After determining $E(x_i)$ for a number of different entities in different neighborhoods, the distribution of $E(x)$ may provide insight into advertiser revenue. FIG. 5 schematically illustrates the distribution of $E(x)$ based on a random sample of 500 advertisers in the yellow pages directory. The x-axis shows $E(x)$ grouped according to decile and the y-axis shows the percentage of the advertisers falling into each decile.

In the exemplary implementation illustrated in FIG. 5, the neighborhoods have 4 observations ($x_i$ and three neighbors). Therefore, $x_i$ has a 25% chance of having the largest revenue.

Referring to FIG. 5, the $\hat{\phi}_i$ estimator distributes the entities having the largest revenue throughout the 80-100% range on the x-axis. The majority of the advertisers, however, are located between 0% and 80%. This may indicate that the majority of advertisers believe that purchasing the minimum ad is sufficient. Alternatively, this may indicate that the majority of advertisers have figured out how to advantageously use discount programs offered by the yellow pages publisher to reduce the cost of their ads.

In a further effort to better understand the characteristics of advertisers with low spending compared to their neighbors, processes consistent with the present invention may use a decision tree to attempt to predict how the difference between the revenue of $x_i$ and its estimated maximum revenue (i.e., $\hat{\phi}_i - x_i$) relates to the underlying variables associated with the entities.

Figure 6:
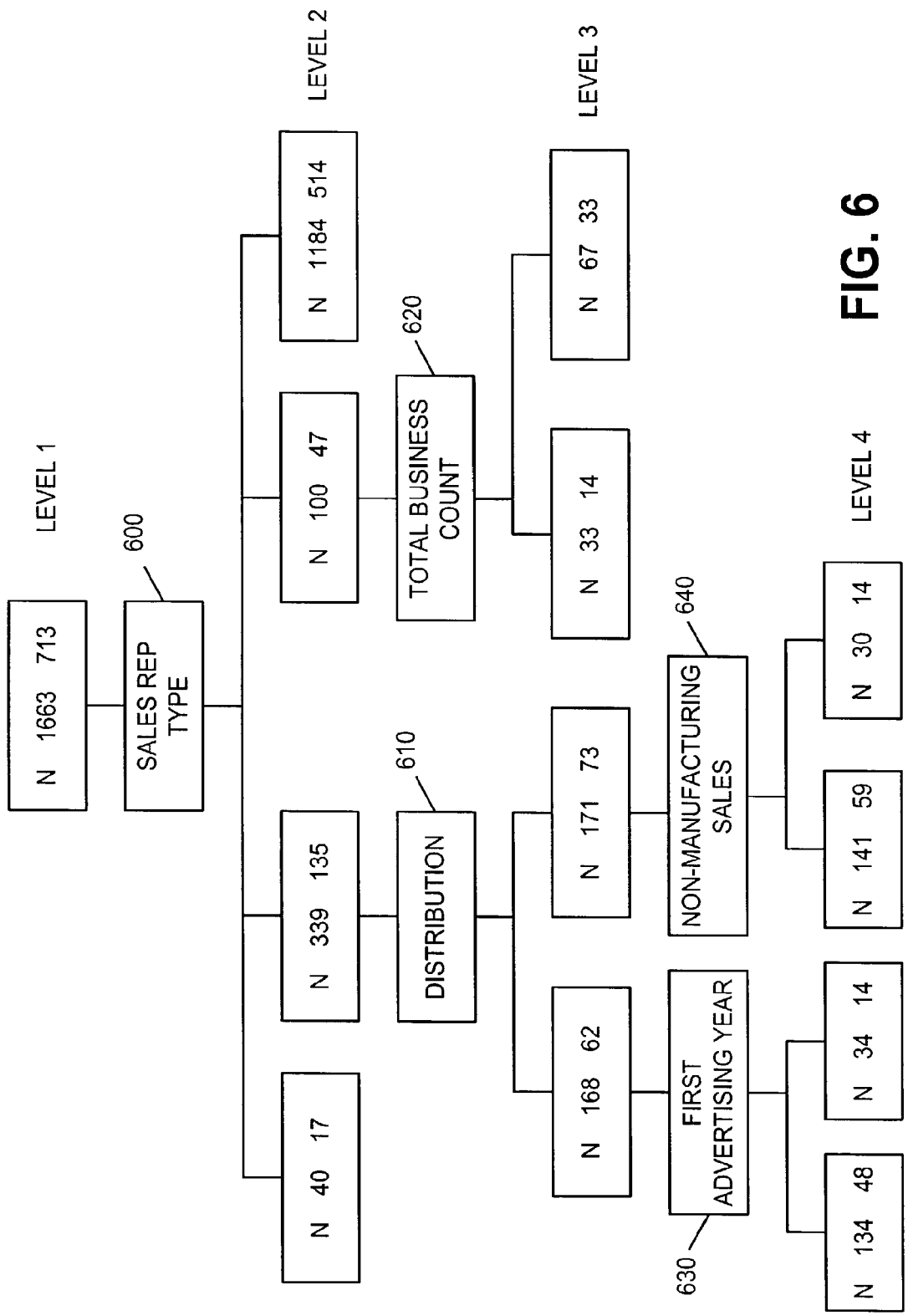
FIG. 6 is an exemplary decision tree associated with a random sample of entities.

FIG. 6 schematically depicts a portion of a decision tree for a random sample of entities. As shown in FIG. 6, the top box at level 1 in the decision tree indicates that 713 out of 1663 observations $\hat{\phi}_i - x_i$ lie above a specified threshold (i.e., the revenue discrepancy between actual revenue and the target for 713 out of the 1663 entities lies above a specified value). Box 600, labeled sales rep type, then splits the 1663 entities based on the type of sales representatives that handle contacting these entities to purchase yellow pages ads, resulting in the four proportions of entities illustrated at level 2. Boxes 610-640, labeled distribution, total business count, first advertising year and non-manufacturing sales, respectively, further break down the entities. Theoretically, the decision tree may continue until the boxes at the lowest level of the decision tree indicate that every observation is above the threshold or every observation is below the threshold. This would then give the publisher of the yellow pages directory insight into which factor(s) may affect advertiser revenue, in terms of its deviation from its estimated maximum, more than other factors. In the exemplary decision tree in FIG. 6, the sales representative type is the most important factor shown since the split among the entities at level 2 shows greater variances than with respect to the other variables at levels 3 and 4.

Other important factors related to the split may include directory distribution size, market size and annual revenue from the advertiser. Directory characteristics, such as the number of advertisers and ad price, and market characteristics such as business count and household income are also important. If the right most node at level 2 is expanded, ad price, median home value, and market heading penetration can also be used to more finely breakdown advertisers. In each case, the decision tree may help the publisher of the yellow pages directory identify various variables that have a greater impact on the revenue it receives from the advertisers. This information may then be used to change the operating procedures of the sales force.

Since neighborhoods contain advertisers with similar business, directory and market characteristics, sales people in direct contact with advertisers could use the information not only for targeting advertisers for the upsell opportunities described above, but also for identifying product features associated with intra-neighborhood competition. The visual attraction of ads, as the result of increasing the size, adding information, color, etc., from similar businesses may provide the nudge to persuade competitive advertisers to purchase more products.

Systems and methods consistent with the present invention combine nearest neighbor methodology and statistical methods to extend the econometric task of frontier analysis. An advantage of the present invention is that customers having similar characteristics may be identified and the customers with low spending compared to their peers may be identified. Such customers may then be targeted for increased sales focus and upselling, thereby increasing the potential revenue from these sources.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while some or all of the processes described above have been described as being performed on system 100, the present invention may be performed using any computing device. In addition, while series of acts have been described with respect to FIGS. 2 and 4, the order of the acts may be modified in other implementations consistent with the present invention. Moreover, non-dependent acts may be performed in parallel.

In addition, the present invention has also been described with the example of dentists that advertise in the yellow pages, where the business target is advertising revenue for the publisher of the yellow pages. It should be understood that the present invention may be used to set any performance level or business target associated with any types of entities for any business or division of a business.

Lastly, the present invention has been described as using particular equations to identify the neighborhoods and to estimate the frontier. Other statistical methods may also be used in other implementations of the invention. For example, in situations where the dataset is too large or complex, even with complexity reducing measures described above, sampling may be used. For example, the neighborhoods may be identified from a representative sample. The maximum estimates may then be generated using the process described above with respect to FIG. 4. Other efficient data mining methods (e.g. neural networks) may also be used to identify a model that maps sample observations to their estimates. This model can then be applied to the remaining observations for predicting their estimates. These estimates, being constructed from a neural network or decision tree model, are therefore unlikely to be outliers. In other words, nearest neighbor methodology would be used to change the task from an unsupervised task to a supervised task, where other methods can then be applied to generate the estimates.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method to be practiced on a computer for identifying under-marketed entities for target up-selling, said method comprising:
   defining, by first operation of said computer, a data neighborhood of said entities;
   assigning, by second operation of said computer, a frontier for said data neighborhood wherein said frontier minus observations of said entities is a statistical distribution taking on only non-negative values and is selected from the group consisting of exponential, Gamma and half-Normal distributions;
   calculating, by third operation of said computer, an estimator for said frontier to represent a maximum target and a minimum target for each one of said observations from which performance goals for said target up-selling to said under-marketed entities are set; and outputting, by fourth operation of said computer, via at least one of a display, a printer and a speaker information about said maximum target, said minimum target and/or said goals to a user of said information, whereby said under-marketed entities for said target up-selling is identified.

2. The method of claim 1 wherein said statistical distribution is an exponential distribution.

3. The method of claim 2 wherein said data neighborhood defining comprises:

gathering a dataset of said observations;

denoting a vector and an observed value for each one of said observations;

establishing a neighborhood for said vector with a plurality of said entities at a distance from said vector, said distance being minimum distance;

calculating a first distance associated with continuous variables related to said observations and a second distance associated with nominal variables related to said observations; and calculating total distance between two of said observations by adding contributions from said continuous and said nominal variables and repeating said total distance calculating for all of said observations, thereby defining said neighborhood by at least a subset of said observations, each observation in said subset being at said minimum distance from said vector.

4. The method of claim 3 further comprising:

stopping, by fifth operation of said computer, said total distance calculating before completing said total distance calculating if a current distance being calculated is greater than that of said minimum distance, thereby increasing computational efficiency.

* * * * *